(12) United States Patent
Xu et al.

(10) Patent No.: US 10,420,117 B2
(45) Date of Patent: Sep. 17, 2019

(54) BEARER ESTABLISHMENT METHOD, USER EQUIPMENT, AND BASE STATION

(71) Applicant: HUAWEI TECHNOLOGIES CO., LTD., Shenzhen, Guangdong (CN)

(72) Inventors: Xiaoying Xu, Shanghai (CN); Xiaoxiao Zheng, Shanghai (CN); Lingli Pang, Shanghai (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 0 days.

(21) Appl. No.: 15/823,418

(22) Filed: Nov. 27, 2017

(65) Prior Publication Data

US 2018/0084564 A1    Mar. 22, 2018

Related U.S. Application Data (63) Continuation of application No. PCT/CN2015/080370, filed on May 29, 2015.

(51) Int. Cl.
*H04W 72/00* (2009.01)
*H04W 72/08* (2009.01)
(Continued)

(52) U.S. Cl.
CPC ......... *H04W 72/087* (2013.01); *H04W 72/10* (2013.01); *H04W 76/10* (2018.02);
(Continued)

(58) Field of Classification Search
CPC ........... H04W 72/087; H04W 72/0413; H04W 72/0453; H04W 76/27; H04W 76/10;
(Continued)

(56) References Cited

U.S. PATENT DOCUMENTS

2004/0266435 A1* 12/2004 de Jong ................ H04W 36/14
455/436
2012/0140743 A1* 6/2012 Pelletier ............ H04W 72/0453
370/335
(Continued)

FOREIGN PATENT DOCUMENTS

CN         1809216 A        7/2006
CN         1809218 A        7/2006
(Continued)

OTHER PUBLICATIONS

3GPP TS 36.331 V12.5.0 (Mar. 2015),3rd Generation Partnership Project;Technical Specification Group Radio Access Network;Evolved Universal Terrestrial Radio Access (E-UTRA);Radio Resource Control (RRC);Protocol specification (Release 12),total 445 pages.
(Continued)

*Primary Examiner* — Barry W Taylor
(74) *Attorney, Agent, or Firm* — Fish & Richardson P.C.

(57) ABSTRACT

The present invention discloses a bearer establishment method, user equipment, and a base station. The method includes: configuring, by user equipment (UE), a bearer for the UE by using a pre-stored configuration parameter, where the pre-stored configuration parameter includes an access stratum (AS) configuration parameter; and sending, by the UE, service data to a base station by using the bearer.

12 Claims, 2 Drawing Sheets

UE locally configures a bearer by using a pre-stored configuration parameter, where the pre-stored configuration parameter includes: an access stratum AS configuration parameter, or the pre-stored configuration parameter includes: an AS configuration parameter and a non-access stratum NAS configuration parameter /11

The UE sends service data to a base station by using the bearer /12

(51) Int. Cl.
*H04W 76/12* (2018.01)
*H04W 76/27* (2018.01)
*H04W 76/10* (2018.01)
*H04W 72/10* (2009.01)
*H04W 72/04* (2009.01)
*H04W 76/11* (2018.01)

(52) U.S. Cl.
CPC .......... *H04W 76/12* (2018.02); *H04W 76/27* (2018.02); *H04W 72/0413* (2013.01); *H04W 72/0453* (2013.01); *H04W 76/11* (2018.02)

(58) Field of Classification Search
CPC ............ H04W 76/04; H04W 28/0268; H04W 28/0289
See application file for complete search history.

(56) References Cited

U.S. PATENT DOCUMENTS

| | | | | |
|---|---|---|---|---|
| 2012/0218973 | A1* | 8/2012 | Du | H04W 36/14 370/331 |
| 2015/0264631 | A1* | 9/2015 | Zhang | H04W 48/08 370/329 |
| 2016/0219605 | A1* | 7/2016 | Karlsson | H04W 72/06 |
| 2016/0234715 | A1* | 8/2016 | Futaki | H04W 48/06 |
| 2017/0289969 | A1* | 10/2017 | Zhou | H04W 72/0446 |
| 2017/0374579 | A1* | 12/2017 | Wang | H04W 28/0278 |
| 2018/0352487 | A1* | 12/2018 | Fan | H04W 36/0038 |
| 2019/0098520 | A1* | 3/2019 | Kim | H04W 24/04 |

FOREIGN PATENT DOCUMENTS

| | | |
|---|---|---|
| CN | 1859766 A | 11/2006 |
| CN | 102868421 A | 1/2013 |
| EP | 1781057 A1 | 5/2007 |
| EP | 2866498 A1 | 4/2015 |
| WO | 2006104946 A1 | 10/2006 |
| WO | 2008133476 A1 | 11/2008 |

OTHER PUBLICATIONS

International Search Report in International Application No. PCT/CN2015/080370, dated Mar. 7, 2016, 6 pages.

Extended European Search Report issued in European Application No. 15893626.0 dated Mar. 26, 2018, 8 pages.

* cited by examiner

BEARER ESTABLISHMENT METHOD, USER EQUIPMENT, AND BASE STATION

CROSS-REFERENCE TO RELATED APPLICATIONS

This application is a continuation of International Application No. PCT/CN2015/080370, filed on May 29, 2015, the disclosure of which is hereby incorporated by reference in its entirety.

TECHNICAL FIELD

The present invention relates to the field of communications technologies, and in particular, to a bearer establishment method, user equipment, and a base station.

BACKGROUND

In a Long Term Evolution (LTE) technology, user equipment (UE) establishes a bearer while connecting to a network, regardless of whether the UE initiates a service. If a service initiated by the UE needs transmission of relatively sparse data or the UE does not initiate any service, the established bearer is wasted.

To improve resource usage, in a 3rd-Generation (3G) mobile communications technology, it is proposed that UE establishes a bearer when the UE initiates a service. In the 3G mobile communications technology, the UE initiates a bearer activation request to a radio network controller (RNC) when initiating a service, and establishes a bearer by exchanging signaling with the RNC, an serving GPRS support node (SGSN), and a gateway (GW). In a process of establishing the bearer during initiation of the service, the UE needs to exchange signaling messages with multiple network devices. Consequently, bearer establishment delays and overheads are relatively large.

SUMMARY

Embodiments of the present invention provide a bearer establishment method, user equipment, and a base station, to reduce delays and overheads caused when user equipment establishes a bearer.

A first aspect of the embodiments of the present invention provides a bearer establishment method, including:
  configuring, by user equipment (UE), a bearer for the UE by using a pre-stored configuration parameter, where the pre-stored configuration parameter includes an access stratum (AS) configuration parameter, or the pre-stored configuration parameter includes an AS configuration parameter and a non-access stratum (NAS) configuration parameter; and
  sending, by the UE, service data to a base station by using the bearer.

With reference to the first aspect, in a first possible implementation of the first aspect, the pre-stored configuration parameter includes N sets of configuration parameters, where N is an integer greater than or equal to 1, and the configuring, by UE, a bearer for the UE by using a pre-stored configuration parameter includes:
  selecting, by the UE, one set of configuration parameters from the N sets of configuration parameters according to one of the following parameters: a service type of the service data, a quality of service (QoS) parameter of the service data, a group identity of the UE, APN information of the UE, or ARP information of the UE; and
  configuring, by the UE, the bearer for the UE by using the selected set of configuration parameters.

With reference to the first possible implementation of the first aspect, in a second possible implementation of the first aspect, after the configuring, by the UE, the bearer for the UE by using the selected set of configuration parameters, the method further includes:
  sending, by the UE, a radio resource control (RRC) message, a data packet, or an access sequence that includes an identifier of the bearer to the base station, so that the base station determines an access network bearer of the UE according to the identifier of the bearer.

With reference to the first aspect, or with reference to the first possible implementation of the first aspect, or with reference to the second possible implementation of the first aspect, in a third possible implementation of the first aspect, after the sending, by the UE, the service data to a base station by using the bearer, the method further includes:
  sending, by the UE, some parameters of the configuration parameters of the bearer to the base station, so that the base station determines a core network bearer of the UE according to the some parameters, where the some parameters include at least one of the following parameters:
  the APN information, a destination gateway address, an uplink tunnel endpoint identifier (TEID), an identifier of the core network bearer, a type of the service data, or the QoS parameter of the service data.

With reference to the first aspect, or with reference to any one of the first possible implementation of the first aspect to the third possible implementation of the first aspect, in a fourth possible implementation of the first aspect, after the sending, by the UE, the service data to a base station by using the bearer, the method further includes:
  when a serving cell in which the UE is located changes or the base station serving the UE changes, locally reconfiguring, by the UE, a bearer by using the pre-stored configuration parameter; and
  sending, by the UE, data to a changed-to base station by using the reconfigured bearer.

A second aspect of the embodiments of the present invention provides a bearer establishment method, including:
  pre-configuring, by a base station, a bearer for the base station, where a configuration parameter used by the base station to configure the bearer includes an access stratum (AS) configuration parameter, or a configuration parameter used by the base station to configure the bearer includes an AS configuration parameter and a non-access stratum (NAS) configuration parameter; and
  receiving, by the base station, service data of UE by using the bearer pre-configured by the base station.

With reference to the second aspect, in a first possible implementation of the second aspect, the bearer pre-configured by the base station includes N bearers, where N is an integer greater than or equal to 1; and the receiving, by the base station, service data of UE by using the bearer pre-configured by the base station includes:
  receiving, by the base station, an RRC message, a data packet, or an access sequence that is sent by the UE and that includes an identifier of a bearer configured by the UE;
  selecting, by the base station from the N bearers, a bearer matching the identifier of the bearer configured by the UE, to serve as an access network bearer of the UE; and receiving, by the base station, the service data of the UE by using the selected bearer.

With reference to the second aspect or with reference to the first possible implementation of the second aspect, in a second possible implementation of the second aspect, after the receiving, by the base station, service data of UE by using the bearer pre-configured by the base station, the method further includes:
  receiving, by the base station, some parameters of configuration parameters of the bearer configured by the UE, where the some parameters include at least one of the following parameters:
  APN information, a destination gateway address, an uplink TEID, an identifier of a core network bearer, a type of the service data, or a QoS parameter of the service data; and
  determining, by the base station, the core network bearer of the UE according to the some parameters.

With reference to the second aspect, or with reference to the first possible implementation of the second aspect, or with reference to the second possible implementation of the second aspect, in a third possible implementation of the second aspect, after the receiving, by the base station, service data of UE by using the locally pre-configured bearer, the method further includes:
  selecting, by the base station according to at least one of the following parameters, a public bearer from public bearers existing between the base station and a core network, to serve as the core network bearer of the UE, where
  the parameters include: the type of the service data, the QoS parameter of the service data, and a mapping relationship between the public bearer and the bearer that is pre-configured by the base station.

A third aspect of the embodiments of the present invention provides user equipment (UE), including:
  a bearer configuration unit, configured to configure a bearer for the UE by using a pre-stored configuration parameter, where the pre-stored configuration parameter includes an access stratum (AS) configuration parameter, or the pre-stored configuration parameter includes an AS configuration parameter and a non-access stratum (NAS) configuration parameter; and
  a sending unit, configured to send service data to a base station by using the bearer.

With reference to the third aspect, in a first possible implementation of the third aspect, the pre-stored configuration parameter includes N sets of configuration parameters, where N is an integer greater than or equal to 1; and the bearer configuration unit is configured to:
  select one set of configuration parameters from the N sets of configuration parameters according to one of the following parameters: a service type of the service data, a QoS parameter of the service data, a group identity of the UE, APN information of the UE, or ARP information of the UE; and configure the bearer for the UE by using the selected set of configuration parameters.

With reference to the first possible implementation of the third aspect, in a second possible implementation of the third aspect, the sending unit is further configured to:
  send an RRC message, a data packet, or an access sequence that includes an identifier of the bearer to the base station, so that the base station determines an access network bearer of the UE according to the identifier of the bearer.

With reference to the third aspect, or with reference to the first possible implementation of the third aspect, or with reference to the second possible implementation of the third aspect, in a third possible implementation of the third aspect, the sending unit is further configured to:
  send some parameters of the configuration parameters of the bearer to the base station, so that the base station determines a core network bearer of the UE according to the some parameters, where the some parameters include at least one of the following parameters:
  the APN information, a destination gateway address, an uplink TEID, an identifier of the core network bearer, a type of the service data, or the QoS parameter of the service data.

With reference to the third aspect, or with reference to any one of the first possible implementation of the third aspect to the third possible implementation of the third aspect, in a fourth possible implementation of the third aspect, the bearer configuration unit is further configured to:
  when a serving cell in which the UE is located changes or the base station serving the UE changes, locally reconfigure a bearer by using the pre-stored configuration parameter; and send data to a changed-to base station by using the reconfigured bearer.

A fourth aspect of the embodiments of the present invention provides a base station, including:
  a bearer configuration unit, configured to pre-configure a bearer for the base station, where a configuration parameter used by the base station to configure the bearer includes an access stratum (AS) configuration parameter, or a configuration parameter used by the base station to configure the bearer includes an AS configuration parameter and a non-access stratum (NAS) configuration parameter; and
  a receiving unit, configured to receive service data of UE by using the bearer pre-configured by the base station.

With reference to the fourth aspect, in a first possible implementation of the fourth aspect, the bearer pre-configured by the base station includes N bearers, where N is an integer greater than or equal to 1; and the receiving unit is configured to:
  receive an RRC message, a data packet, or an access sequence that is sent by the UE and that includes an identifier of a bearer configured by the UE;
  the base station further includes a processing unit, configured to select, from the N bearers, a bearer matching the identifier of the bearer configured by the UE, to serve as an access network bearer of the UE; and
  the receiving unit is configured to receive the service data of the UE by using the selected bearer.

With reference to the fourth aspect or with reference to the first possible implementation of the fourth aspect, in a second possible implementation of the fourth aspect, the receiving unit is configured to:
  receive some parameters of configuration parameters of the bearer configured by the UE, where the some parameters include at least one of the following parameters:
  APN information, a destination gateway address, an uplink TEID, an identifier of a core network bearer, a type of the service data, or a QoS parameter of the service data; and
  the processing unit is configured to determine the core network bearer of the UE according to the some parameters.

With reference to the fourth aspect, or with reference to the first possible implementation of the fourth aspect, or with reference to the second possible implementation of the fourth aspect, in a third possible implementation of the fourth aspect, the processing unit is configured to:

select, according to at least one of the following parameters, a public bearer from public bearers existing between the base station and a core network, to serve as the core network bearer of the UE, where the parameters include: the type of the service data, the QoS parameter of the service data, and a mapping relationship between the public bearer and the bearer that is pre-configured by the base station.

A fifth aspect of the embodiments of the present invention provides user equipment (UE), including:

a processor, configured to configure a bearer for the UE by using a pre-stored configuration parameter, where the pre-stored configuration parameter includes an access stratum (AS) configuration parameter, or the pre-stored configuration parameter includes an AS configuration parameter and a non-access stratum (NAS) configuration parameter; and a transmitter, configured to send service data to a base station by using the bearer.

With reference to the fifth aspect, in a first possible implementation of the fifth aspect, the pre-stored configuration parameter includes N sets of configuration parameters, where N is an integer greater than or equal to 1; and the processor is further configured to: select one set of configuration parameters from the N sets of configuration parameters according to one of the following parameters: a service type of the service data, a QoS parameter of the service data, a group identity of the UE, APN information of the UE, or ARP information of the UE; and configure the bearer for the UE by using the selected set of configuration parameters.

With reference to the first possible implementation of the fifth aspect, in a second possible implementation of the fifth aspect, the transmitter is further configured to send an RRC message, a data packet, or an access sequence that includes an identifier of the bearer to the base station, so that the base station determines an access network bearer of the UE according to the identifier of the bearer.

With reference to the fifth aspect, or with reference to the first possible implementation of the fifth aspect, or with reference to the second possible implementation of the fifth aspect, in a third possible implementation of the fifth aspect, the transmitter is further configured to send some parameters of the configuration parameters of the bearer to the base station, so that the base station determines a core network bearer of the UE according to the some parameters, where the some parameters include at least one of the following parameters: the APN information, a destination gateway address, an uplink TEID, an identifier of the core network bearer, a type of the service data, or the QoS parameter of the service data.

With reference to the fifth aspect, or with reference to any one of the first possible implementation of the fifth aspect to the third possible implementation of the fifth aspect, in a fourth possible implementation of the fifth aspect, the processor is further configured to: when a serving cell in which the UE is located changes or the base station serving the UE changes, locally reconfigure a bearer by using the pre-stored configuration parameter; and send data to a changed-to base station by using the reconfigured bearer.

A sixth aspect of the embodiments of the present invention provides a base station, including:

a processor, configured to pre-configure a bearer for the base station, where a configuration parameter used by the base station to configure the bearer includes an access stratum (AS) configuration parameter, or a configuration parameter used by the base station to configure the bearer includes an AS configuration parameter and a non-access stratum (NAS) configuration parameter; and a receiver, configured to receive service data of the UE by using the bearer pre-configured by the base station.

With reference to the sixth aspect, in a first possible implementation of the sixth aspect, the bearer pre-configured by the base station includes N bearers, where N is an integer greater than or equal to 1; and the receiver is further configured to receive an RRC message, a data packet, or an access sequence that is sent by the UE and that includes an identifier of a bearer configured by the UE;

the processor is further configured to select, from the N bearers, a bearer matching the identifier of the bearer configured by the UE, to serve as an access network bearer of the UE; and the receiver is further configured to receive the service data of the UE by using the selected bearer.

With reference to the sixth aspect, or with reference to the first possible implementation of the sixth aspect, in a second possible implementation of the sixth aspect, the receiver is further configured to receive some parameters of configuration parameters of the bearer configured by the UE, where the some parameters include at least one of the following parameters: APN information, a destination gateway address, an uplink TEID, an identifier of a core network bearer, a type of the service data, or a QoS parameter of the service data; and the processor is further configured to determine the core network bearer of the UE according to the some parameters.

With reference to the sixth aspect, or with reference to the first possible implementation of the sixth aspect, or with reference to the second possible implementation of the sixth aspect, in a third possible implementation of the sixth aspect, the processor is further configured to select, according to at least one of the following parameters, a public bearer from public bearers existing between the base station and a core network, to serve as the core network bearer of the UE, where the parameters include: the type of the service data, the QoS parameter of the service data, and a mapping relationship between the public bearer and the bearer that is pre-configured by the base station.

The one or more technical solutions provided in the embodiments of the present invention have at least the following technical effects or advantages:

The embodiments of the present invention provide a bearer establishment method, including: locally configuring, by user equipment, a bearer by using a pre-stored configuration parameter, and sending, by the user equipment, service data to a base station by using the configured bearer.

The user equipment locally configures the bearer by using the pre-stored configuration parameter, and does not need to establish the bearer by exchanging signaling messages multiple times with at least one network device. Therefore, delays and overheads caused when the bearer is established are reduced.

BRIEF DESCRIPTION OF DRAWINGS

To describe the technical solutions in the embodiments of the present invention more clearly, the following briefly describes the accompanying drawings required for describing the embodiments.

Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a bearer establishment method, to reduce delays and overheads caused when user equipment establishes a bearer.

In the embodiments of the present invention, user equipment locally configures a bearer by using a pre-stored configuration parameter, and the user equipment sends service data to a base station by using the configured bearer.

The user equipment locally configures the bearer by using the pre-stored configuration parameter, and does not need to establish the bearer by exchanging signaling messages multiple times with at least one network device. Therefore, delays and overheads caused when the bearer is established are reduced.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes the implementations of the present invention in detail with reference to accompanying drawings.

The technical solutions of the present invention may be applied to various communications system, for example, a global system for mobile communications (GSM) system, a general packet radio service (GPRS) system, a code division multiple access (CDMA) system, a WCDMA (wideband code division multiple access) system, a long term evolution (LTE) system, and various subsequent evolved wireless communications systems, including, but not limited to a 5th Generation (5G) mobile communications system.

A network architecture of a communications system may be divided into three layers: UE, a radio access network, and a core network. A base station, a base station controller, and an RNC are located on the radio access network. A mobility management entity (MME), a GW, and an SGSN are located on the core network. The core network is connected to another network. For example, the core network is connected to a packet data network.

User equipment (UE), also referred to as a mobile terminal, mobile user equipment, and the like, may communicate with one or more core networks through a radio access network (RAN). The user equipment may be, for example, a mobile phone or a computer with a mobile terminal. For example, the user equipment may be a portable, pocket-sized, handheld, computer built-in, or in-vehicle mobile apparatus.

A base station may be a base transceiver station (BTS) in the GSM or CDMA, may be a NodeB in the WCDMA, or may be an evolved NodeB (eNB or eNodeB) in the LTE, or a network device implementing a similar function in a subsequent evolved system. This is not limited in the present invention. It should be noted that a form of a network device is correspondingly changed according to an actual network deployment requirement. For example, a distributed base station also falls within the protection scope of the present invention.

Figure 1:
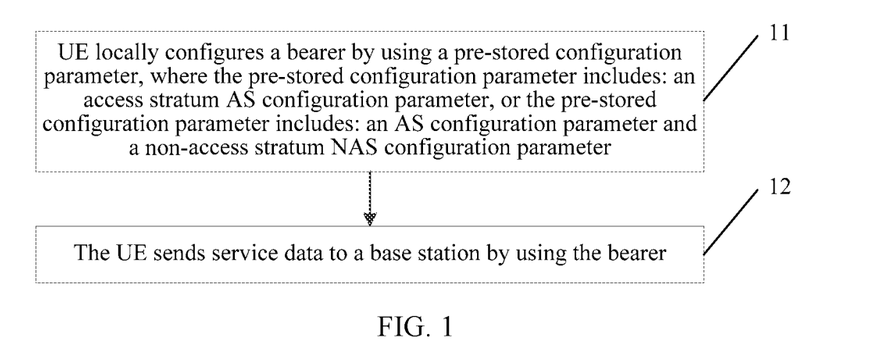
FIG. 1 is a flowchart of a method for establishing a bearer by UE according to an embodiment of the present invention.

Referring to FIG. 1, FIG. 1 is a flowchart showing that UE establishes a bearer according to an embodiment of the present invention.

Step 11: UE configures a bearer for the UE by using a pre-stored configuration parameter, where the pre-stored configuration parameter includes an access stratum (AS) configuration parameter, or the pre-stored configuration parameter includes an AS configuration parameter and a non-access stratum (NAS) configuration parameter.

Step 12: The UE sends service data to a base station by using the bearer.

Figure 2:
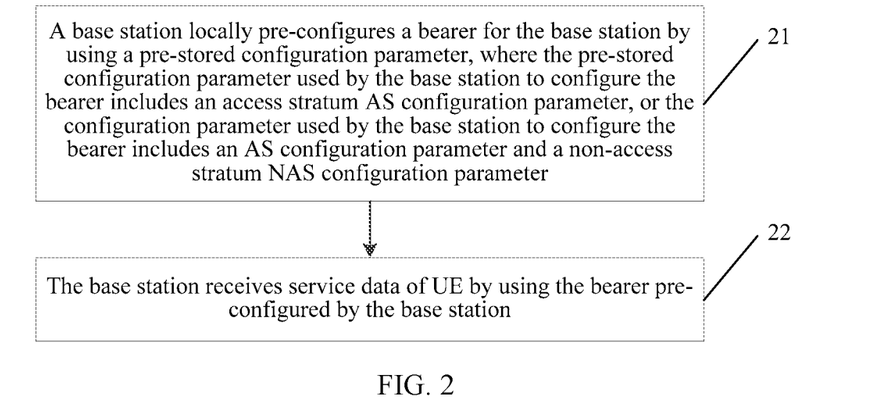
FIG. 2 is a flowchart of a method for establishing a bearer by a base station according to an embodiment of the present invention.

Referring to FIG. 2, FIG. 2 is a flowchart showing that a base station establishes a bearer according to an embodiment of the present invention.

Step 21: A base station pre-configures a bearer for the base station, where a configuration parameter used by the base station to configure the bearer includes an access stratum (AS) configuration parameter, or a configuration parameter used by the base station to configure the bearer includes an AS configuration parameter and a non-access stratum (NAS) configuration parameter.

Step 22: The base station receives service data of UE by using the bearer pre-configured by the base station.

In this embodiment of the present invention, the configuration parameter used by the base station to locally pre-configure the bearer corresponds to a pre-stored configuration parameter of the UE. That is, the configuration parameter used by the base station to configure the bearer and the pre-stored configuration parameter of the UE have same bearer identifiers.

Specifically, if the pre-stored configuration parameter of the UE includes the AS configuration parameter, the base station locally pre-configures the bearer, and the configuration parameter used by the base station to configure the bearer corresponds to the pre-stored configuration parameter of the UE. If the pre-stored configuration parameter of the UE includes the AS configuration parameter and the NAS configuration parameter, both the base station and a core network locally configure the bearer, and the configuration parameter used by the base station to configure the bearer corresponds to the pre-stored configuration parameter of the UE. A configuration parameter used by the core network to configure the bearer is determined by the base station according to the NAS configuration parameter.

The AS configuration parameter includes a media access control layer configuration parameter and a physical layer configuration parameter. The NAS configuration parameter includes at least one of the following parameters: an identifier of a core network bearer, a quality of service class identifier (QCI), an allocation and retention priority (ARP), a traffic flow template (TFT), a destination gateway address, access point name (APN) information, or an uplink TEID.

Optionally, the AS configuration parameter further includes: a packet data convergence protocol (PDCP) configuration parameter (whether to use a status report, a PDCP discard timer, and a PDCP serial number (SN) length), a radio link control (RLC) configuration parameter (a transmission mode and a status report configuration), a logical channel identifier, a logical channel configuration parameter (priority information and a priority bit rate).

Referring to Table 1, various parameters included in pre-stored configuration parameters of UE are listed in Table 1. Referring to Table 2, various parameters included in physical layer configuration parameters are listed in Table 2.

TABLE 1

Table of pre-stored configuration parameters of UE

| | |
|---|---|
| Bearer identifier ID Identifier of a core network bearer | 1 . . . , and N |
| QCI (quality of service class identifier) | QoS-type class |
| ARP (allocation and retention priority) | Allocation and retention priority |
| TFT (traffic flow template) | Main content of a filter is IP quintets (a source address/a destination address/a source port/a destination port/an application layer protocol number over IP). A source IP address, the source port, a destination IP address, the destination port, and the Transmission Layer Protocol may be a part of the quintets |
| Access network data bearer identifier | |
| RLC configuration | Transmission mode and status report configuration |
| Logical channel identifier Priority information Priority bit rate Gateway IP | |
| Uplink TEID | Uplink channel identifier |
| APN | Access point information |
| Media access control layer configuration parameter or configuration ID | maxHARQ-tx, maximum quantity of times of uplink HARQ transmission periodicBSR-Timer, periodic BSR timer retxBSR-Timer, retransmission BSR timer ttiBundling, whether to start continuous transmission drx-Config, whether to start a discontinuous receiving configuration phr-Config, whether to report residual power |
| Physical layer configuration parameter or configuration ID | For a default configuration, refer to the following table |

TABLE 2

Table of physical layer configuration parameters

| Name | Semantics description |
|---|---|
| PDSCH-ConfigDedicated >p-a (PDSCH dedicated configuration>p-a (offset)) | Physical downlink shared channel dedicated configuration parameter |
| PUCCH-ConfigDedicated (PUCCH-dedicated configuration) >tdd-AckNackFeedbackMode (TDD-ACK/Nack feedback mode) >ackNackRepetition (ACK/Nack feedback repetition factor) | Configuration parameter of a physical uplink control channel |
| PUSCH-ConfigDedicated (PUSCH-dedicated configuration) >betaOffset-ACK-Index (offset-ACK-index) >betaOffset-RI-Index (offset-RI-index) >betaOffset-CQI-Index (offset-CQI-index) | Configuration parameter of a physical uplink shared channel |
| Uplink Power Control Dedicated (uplink power control dedicated) >p0-UE-PUSCH (P0-UE-physical uplink shared channel) >deltaMCS-Enabled (deltaMCS-enabled) >accumulationEnabled (accumulation enabled) >p0-UE-PUCCH (P0-UE-physical uplink control channel) >pSRS-Offset (pSRS-offset) >filterCoefficient (filter coefficient) | Configuration parameter of uplink power control >nominal power of a PUSCH >modulation and coding scheme enabled >accumulation enabled >nominal power of a PUCCH >SRS offset >filter coefficient |

TABLE 2-continued

Table of physical layer configuration parameters

| Name | Semantics description |
| --- | --- |
| tpc-pdcch-ConfigPUCCH (power control-PDCCH-configuring a PUCCH) | A power control command of a PUCCH is sent on a PDCCH |
| tpc-pdcch-ConfigPUSCH (power control-PDCCH-configuring a PUSCH) | A power control command of a PUSCH is sent on a PDCCH |
| CQI-ReportConfig (a CQI report configuration)<br>>CQI-ReportPeriodic (CQI-report period)<br>>cqi-ReportModeAperiodic (CQI-report mode)<br>>nomPDSCH-RS-EPRE-Offset (physical downlink shared channel-RS-EPRE-pre-offset) | CQI report configuration parameter |
| SoundingRS-UL-ConfigDedicated (sounding reference signal-uplink-dedicated configuration) | Uplink reference signal configuration |
| AntennaInfoDedicated (antenna information dedicated)<br>>transmissionMode (transmission mode)<br>>codebookSubsetRestriction (codebook subset restriction)<br>>UE-TransmitAntennaSelection (UE-transmit antenna selection) | Dedicated antenna configuration information |
| SchedulingRequestConfig (scheduling request configuration) | |

First, that the UE pre-stores a configuration parameter according to a protocol rule, by using broadcast information, or according to a combination of a protocol rule and broadcast information is described.

If the pre-stored configuration parameter of the UE and the pre-stored configuration parameter of the base station are stipulated in a protocol, in step 11, the UE pre-stores the configuration parameter according to the protocol rule, and in step 21, the base station pre-configures the bearer according to the protocol rule. Moreover, the configuration parameter used by the base station to configure the bearer and the pre-stored configuration parameter of the UE have same bearer identifiers.

If the pre-stored configuration parameter of the UE is obtained by using the broadcast information, in step 21, the base station pre-configures the bearer, and sends, by using broadcast information, a configuration parameter used to configure the bearer to the UE; and in step 11, the UE obtains the configuration parameter from the broadcast information sent by the base station, and then, locally stores the configuration parameter.

If the UE pre-stores the configuration parameter according to a combination of the protocol rule and the broadcast information, in step 21, the base station pre-configures the bearer, and sends, by using the broadcast information, some configuration parameters of the configuration parameters used to configure the bearer to the UE. In step 11, the UE stores some configuration parameters according to the protocol rule, and obtains the remaining some configuration parameters other than the stored some configuration parameters from the broadcast information sent by the base station.

For example, the UE locally stores a physical layer configuration parameter and a media access layer configuration parameter of the configuration parameters according to the protocol rule, stores respective identifiers of the physical layer configuration parameter and the media access layer configuration parameter, receives the broadcast information sent by the base station, obtains the remaining configuration parameters other than the physical layer configuration parameter and the media access layer configuration parameter of the configuration parameters from the broadcast information, and stores respective identifiers of a physical layer configuration parameter and a media access layer configuration parameter that correspond to the remaining configuration parameters. The UE compares, with identifiers in the broadcast information, the identifiers of the physical layer configuration parameter and the media access layer configuration parameter that are locally stored, and merges and stores parameters whose identifiers match with each other.

Subsequently, configuration of a bearer separately performed by the UE and the base station is described.

If there is one set of pre-stored configuration parameters of the UE, that is, there is one bearer identifier, on one hand, the UE locally configures the bearer by using the pre-stored configuration parameter, and then the UE sends service data to the base station by using the configured bearer. On the other hand, the base station locally pre-configures the bearer. The configuration parameter used by the base station to configure the bearer and the pre-stored configuration parameter of the UE have same bearer identifiers. The base station receives the service data of the UE by using the locally pre-configured bearer. The UE and the base station independently configure the bearers.

If there are multiple sets of pre-stored configuration parameters of the UE, that is, there are multiple bearer identifiers, the base station separately locally pre-configures multiple bearers by using the multiple sets of pre-stored configuration parameters. First, the UE selects one set of configuration parameters from the multiple sets of configuration parameters, and then, locally configures the bearer by using the selected set of configuration parameters. Subsequently, the UE sends the identifier of the bearer configured by the UE to the base station. The base station selects, from locally pre-configured multiple bearers according to the identifier of the bearer configured by the UE, a bearer matching the identifier of the bearer configured by the UE, and receives the service data of the UE by using the selected bearer.

The UE selects one set of configuration parameters from the N sets of configuration parameters according to one of the following parameters: a service type of the service data, a QoS parameter of the service data, a group identity of the UE, APN information of the UE, or ARP information of the UE. The UE locally configures the bearer by using the selected set of configuration parameters. The UE sends an RRC message, a data packet, or an access sequence that includes the identifier of the bearer to the base station, so that the base station determines an access network bearer of the UE according to the identifier of the bearer.

The base station receives the RRC message, the uplink data packet, or the access sequence that is sent by the UE and that includes the identifier of the bearer configured by the UE. The base station selects, from the N bearers, a bearer matching the identifier of the bearer configured by the UE, to serve as the access network bearer of the UE. The base station receives the service data of the UE by using the selected bearer.

If the UE indicates the bearer identifier in the RRC message or a MAC packet, and the base station grant permission after receiving the identifier, the base station determines a bearer parameter to be used by a user and configures a service bearer according to the bearer identifier.

First, a method for configuring the bearer by the UE is described.

In a first step, the UE selects one set of configuration parameters from the N sets of configuration parameters according to the group identity of the UE, the APN information of the UE, the ARP information of the UE, the service type of the UE, or the QoS parameter of the service data of the UE.

Specifically, the UE selects one set of configuration parameters from the N sets of configuration parameters according to the group identity of the UE. After the UE attaches to a network, the network specifies a group to which the UE belongs. The group identity of the UE may be an identity of the group to which the UE belongs. Alternatively, the group identity of the UE is obtained according to an identifier of the UE. The identifier of the UE is a unique identifier used to distinguish the UE from another UE. The identifier of the UE modulo a number is the group identity of the UE. Each of the N sets of configuration parameters has an identifier. The UE selects, from the N sets of configuration parameters, one set of configuration parameters matching the group identity of the UE. For example, if the group identity of the UE is 1, and bearer identifiers of the N sets of configuration parameters are respectively 1 to N, the set of configuration parameters selected by the UE is a set of configuration parameters whose bearer identifier is 1 in the N sets of configuration parameters.

Specifically, the UE selects one set of configuration parameters from the N sets of configuration parameters according to the APN information of the UE. The APN information or the ARP information has a function similar to that of the group identity of the UE. Multiple UEs having the same APN information may be considered as UEs in one group, and have a same group identity. Each of the N sets of configuration parameters includes the APN information. The UE selects, from the N sets of configuration parameters, one set of configuration parameters matching the APN information or the ARP information of the UE. For example, if the APN information of the UE is ABC, and the bearer identifiers of the N sets of configuration parameters are respectively 1 to N, the UE selects, according to the APN information and a policy, the set of configuration parameters that matches the policy. For example, an APN of the ABC allows to use one set of configuration parameters whose bearer identifier is 1 in the N sets of configuration parameters. The policy may be sent by a network to the UE or may be configured by an operator for the UE.

Specifically, the UE selects one set of configuration parameters from the N sets of configuration parameters according to the QoS parameter of the service data sent by the UE. Different service data has different QoS requirements. Different QoS parameters belong to different QCIs. Each of the N sets of configuration parameters includes a QCI or an ARP. Therefore, the UE first determines a QCI of the QoS parameter of the sent service data, and then selects, from the N sets of configuration parameters, one set of configuration parameters matching the QCI determined by the UE.

For example, if the QCI determined by the UE is 1, and the QCI includes 1 to N, one set of configuration parameters that is selected by the UE according to priority information and that matches the QCI is the set of configuration parameters whose QCI is 1 in the N sets of configuration parameters. Alternatively, the UE determines a bearer parameter such as a proper logical channel priority or an HARQ transmission parameter according to QCI information, and then selects a bearer according to the bearer parameter. The ARP information is specified by the network. For example, the UE determines a bearer parameter of the UE according to the ARP information, where the bearer parameter may be a logical channel priority of an RLC layer and the like, and then selects the bearer according to the bearer parameter. The UE can configure bearers suitable for different QoS according to a QoS parameter of an initiated service, thereby implementing control over different QoS.

Specifically, the UE selects a proper bearer parameter according to a characteristic of a service type. For example, for a small packet, a bearer parameter having a short RLC length or having no RLC header overhead is selected. For a large data packet, a bearer parameter having a long RLC length or having RLC header overheads is selected. Then, a bearer is selected according to the bearer parameter.

In a second step, the UE locally configures the bearer by using the selected set of configuration parameters.

Subsequently, that the UE notifies the base station of the identifier of the bearer configured by the UE is described.

After the UE locally configures the bearer, the base station needs to receive the service data of the UE by using a corresponding bearer. The corresponding bearer means that a configuration parameter used for the bearer used by the base station to receive the service data of the UE and the configuration parameter used by the UE to configure the bearer have same bearer identifiers. Therefore, after the UE locally configures the bearer, the UE needs to send, by using the RRC message, the data packet, or the access sequence, the identifier of the bearer configured by the UE to the base station. Optionally, after sending the identifier of the bearer to the base station, the UE performs configuration after obtaining permission from the base station. For example, after the UE sends the RRC message, the MAC packet, or the like to the base station, the UE is allowed to use the bearer after receiving response information, and the UE then configures the bearer for service data transmission.

Then, configuration of a bearer by the base station is described.

The base station receives the RRC message, the data packet, or the access sequence that is sent by the UE and that includes the identifier of the bearer configured by the UE, and obtains, from a header of the data packet or the access sequence, the identifier of the bearer configured by the UE. The base station determines, according to the identifier of the bearer configured by the UE, one set of configuration parameters that are in the N sets of configuration parameters and that are used by the UE to configure the bearer, and obtains an identifier of the access network bearer from the set of configuration parameters used by the UE, then, selects, from pre-configured N bearers, a bearer matching the identifier of the access network bearer in the configuration parameters used by the UE, and receives, by using the selected bearer, the service data sent by the UE.

In the foregoing implementation solutions, considering mobility of the UE, if a serving cell in which the UE is located changes or the base station serving the UE changes, the UE needs to reconfigure a bearer.

When the serving cell in which the UE is located changes or the base station serving the UE changes, the UE locally reconfigures a bearer by using the pre-stored configuration parameter; and sends data to a changed-to base station by using the reconfigured bearer.

Specifically, if the UE moves across cells, that is, from one cell to another cell, or if the UE moves across base stations, that is, from a service coverage area of one base station to a service coverage area of another base station, data transmission between the UE and the original base station is interrupted. The new base station also locally pre-configures a bearer by using a configuration parameter. The UE needs to locally reconfigure a bearer by using a same set of configuration parameters as that used by the new base station, and then sends, to the new base station, data that has not been successfully sent to the original base station, or instructs the new base station to resend data that has not been successfully sent by the original base station to the UE.

It should be noted that the bearer that is reconfigured by the UE and the bearer that has been configured by the UE before the UE moves across cells or across base stations may be the same or may be different.

If the pre-stored configuration parameter of the UE is stipulated in a protocol rule, the bearer that is reconfigured by the UE and the bearer that has been configured by the UE before the UE moves across cells or across base stations are the same. The base station changes because the UE moves across cells or across base stations, and consequently a broadcast message sent by the new base station and the broadcast message sent by the original base station may be different. Therefore, if all or some of the pre-stored configuration parameters of the UE are obtained from a broadcast message sent by the base station, the bearer that is reconfigured by the UE and the bearer that has been configured by the UE before the UE moves across cells or across base stations may be different.

In the foregoing implementation solutions, for the base station, the base station not only needs to determine the access network bearer of the UE, and then receive the service data of the UE by using the determined bearer, but also needs to determine a core network bearer of the UE, and then forward the received service data by using the determined core network bearer.

As described above, if the configuration parameter includes the AS configuration parameter and the NAS configuration parameter, a core network locally pre-configures the bearer by using the pre-stored configuration parameter. A configuration parameter used by the core network and the configuration parameter used by the base station to pre-configure the bearer have same bearer identifiers. In this case, a method for determining the core network bearer of the UE by the base station is determining the core network bearer according to an identifier of the core network.

Specifically, the base station determines, according to the identifier of the bearer configured by the UE, the set of configuration parameters that are in the N sets of configuration parameters and that are used by the UE to configure the bearer, obtains the identifier of the core network bearer from the set of configuration parameters used by the UE, and determines the core network bearer of the UE.

If the configuration parameter includes the AS configuration parameter, the base station determines the core network bearer of the UE by using the following two methods.

In a first method, the core network bearer is determined according to some parameters in configuration parameters used by the UE to configure the bearer. Therefore, after the UE sends data to the base station by using the bearer, the method further includes: sending, by the UE, some parameters of the configuration parameters of the bearer to the base station, so that the base station determines the core network bearer of the UE according to the some parameters. The some parameters include at least one of the following parameters: APN information, a destination gateway address, an uplink TEID, a type of the service data, or a QoS parameter of the service data. Correspondingly, after the base station receives the service data of the UE by using the locally pre-configured bearer, the method further includes: receiving, by the base station, the some parameters of the configuration parameters of the bearer configured by the UE, where the some parameters include at least one of the following parameters: the APN information, the destination gateway address, the uplink TEID, the type of the service data, or the QoS parameter of the service data; and determining, by the base station, the core network bearer of the UE according to the some parameters.

Specifically, after locally configuring the bearer, the UE selects at least one of the some configuration parameters of the configuration parameters used to configure the bearer: the APN information, the destination gateway address, the uplink TEID, the type of the service data sent by the UE, or the QoS parameter of the service data sent by the UE, and then sends the selected parameter to the base station. The base station receives the parameter sent by the UE, and determines the core network bearer of the UE according to the parameter sent by the UE.

When the base station is connected to only one gateway, the base station may determine the core network bearer of the UE according to the uplink TEID. When no tunneling protocol is used, the base station may determine the core network bearer of the UE according to the connected gateway. In addition, when the base station is connected to multiple gateways or a tunneling protocol is used, the base station needs to determine the core network bearer of the UE by using both the destination gateway address and the uplink TEID.

In a second method, the base station determines the core network bearer of the UE in public bearers existing between the base station and the core network. Therefore, after the base station receives the service data of the UE by using the locally pre-configured bearer, the method further includes: selecting, by the base station according to at least one of the following parameters, a public bearer from the public bearers existing between the base station and the core network, to serve as the core network bearer of the UE. The parameters include: the type of the service data, the QoS parameter of the service data, and a mapping relationship between the public bearer and the bearer that is pre-configured by the base station.

Specifically, if only one public bearer exists between the base station and the core network, to transmit service data of more UEs as much as possible by using the public bearer, the UE may send the service type of the service data of the UE or the QoS parameter of the service data to the base station while sending, to the base station, the identifier of the bearer configured by the UE by using the RRC message, the data packet, or the access sequence. The base station selects a part of service data according to the service type or the QoS parameter, and then transmits the selected part of service data to the core network by using the public bearer. The RRC message may be an RRC connection establishment request message, an RRC connection establishment completion message, or the like.

If multiple public bearers exist between the base station and the core network, the base station stores the mapping relationship between the bearer pre-configured by the base station and the public bearer. After determining the bearer used to receive the service data of the UE, the base station selects a public bearer from the multiple public bearers according to the mapping relationship and the identifier of the bearer used to receive the service data of the UE, and then transmits the service data of the UE to the core network by using the selected public bearer. Certainly, alternatively, the selected public bearer may be considered as the only public bearer existing between the base station and the core network. Then, a part of service data is selected according to the service type or the QoS parameter. The selected part of service data is transmitted to the core network by using the public bearer.

Figure 3:
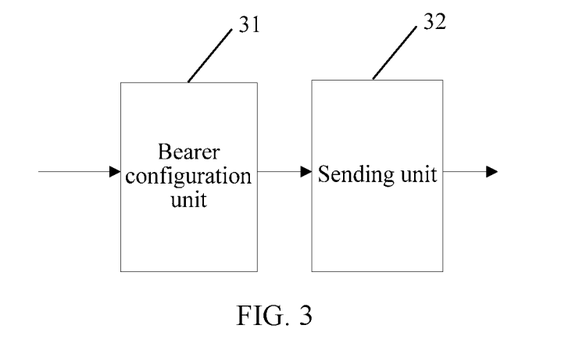
FIG. 3 is a schematic diagram of functional modules of user equipment according to an embodiment of the present invention.

Based on the same invention concept, an embodiment of the present invention further provides user equipment. Referring to FIG. 3, FIG. 3 is a schematic diagram of functional modules of user equipment according to an embodiment of the present invention. For meanings and specific implementation of terms used in the user equipment shown in FIG. 3, refer to related descriptions in FIG. 1, FIG. 2, and the embodiments.

As shown in FIG. 3, the user equipment includes: a bearer configuration unit 31, configured to configure a bearer for the UE by using a pre-stored configuration parameter, where the pre-stored configuration parameter includes: an access stratum (AS) configuration parameter, or the pre-stored configuration parameter includes: an AS configuration parameter and a non-access stratum (NAS) configuration parameter; and a sending unit 32, configured to send service data to a base station by using the bearer.

Optionally, the pre-stored configuration parameter includes N sets of configuration parameters, where N is an integer greater than or equal to 1; and the bearer configuration unit 31 is configured to: select one set of configuration parameters from the N sets of configuration parameters according to one of the following parameters: a service type of the service data, a QoS parameter of the service data, a group identity of the UE, APN information of the UE, or ARP information of the UE; and configure the bearer for the UE by using the selected set of configuration parameters.

Optionally, the sending unit 32 is further configured to: send an RRC message, a data packet, or an access sequence that includes an identifier of the bearer to the base station, so that the base station determines an access network bearer of the UE according to the identifier of the bearer.

Optionally, the sending unit 32 is further configured to: send some parameters of the configuration parameters of the bearer to the base station, so that the base station determines a core network bearer of the UE according to the some parameters, where the some parameters include at least one of the following parameters: the APN information, a destination gateway address, an uplink TEID, an identifier of the core network bearer, a type of the service data, or the QoS parameter of the service data.

Optionally, the bearer configuration unit 31 is further configured to: when a serving cell in which the UE is located changes or the base station serving the UE changes, locally reconfigure a bearer by using the pre-stored configuration parameter; and send data to a changed-to base station by using the reconfigured bearer.

Various variation manners and specific examples in the bearer establishment method in the embodiments of FIG. 1 and FIG. 2 are also applicable to the user equipment in this embodiment. According to the detailed description of the foregoing bearer establishment method, a person skilled in the art may clearly know an implementation method of the user equipment in this embodiment. Therefore, for brevity of the specification, details are not described herein.

Figure 4:
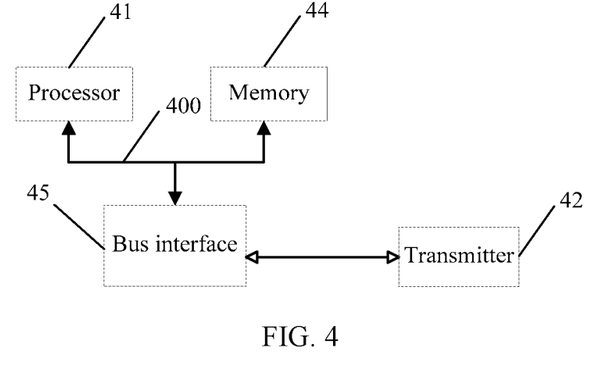
FIG. 4 is a schematic structural diagram of hardware of user equipment according to an embodiment of the present invention.

Based on the same invention concept, an embodiment further provides user equipment. Referring to FIG. 4, FIG. 4 is a schematic structural diagram of hardware of user equipment according to an embodiment of the present invention. For meanings and specific implementation of terms used in the user equipment shown in FIG. 4, refer to related descriptions in FIG. 1, FIG. 2, and the embodiments.

As shown in FIG. 4, the user equipment includes: a processor 41, configured to configure a bearer for the UE by using a pre-stored configuration parameter, where the pre-stored configuration parameter includes: an access stratum (AS) configuration parameter, or the pre-stored configuration parameter includes: an AS configuration parameter and a non-access stratum (NAS) configuration parameter; and a transmitter 42, configured to send service data to a base station by using the bearer.

Optionally, the pre-stored configuration parameter includes N sets of configuration parameters, where N is an integer greater than or equal to 1; and the processor 41 is configured to: select one set of configuration parameters from the N sets of configuration parameters according to one of the following parameters: a service type of the service data, a QoS parameter of the service data, a group identity of the UE, APN information of the UE, or ARP information of the UE; and configure the bearer for the UE by using the selected set of configuration parameters.

Optionally, after the processor 41 configures the bearer for the UE by using the selected set of configuration parameters, the transmitter 42 is further configured to: send an RRC message, a data packet, or an access sequence that includes an identifier of the bearer to the base station, so that the base station determines an access network bearer of the UE according to the identifier of the bearer.

Optionally, after sending the data to the base station by using the bearer, the transmitter 42 is further configured to: send some parameters of the configuration parameters of the bearer to the base station, so that the base station determines a core network bearer of the UE according to the some parameters, where the some parameters include at least one of the following parameters: the APN information, a destination gateway address, an uplink TEID, an identifier of the core network bearer, a type of the service data, or the QoS parameter of the service data.

Optionally, after the transmitter 42 sends the data to the base station by using the bearer, the processor 41 is further configured to: when a serving cell in which the UE is located changes or the base station serving the UE changes, locally reconfigure a bearer by using the pre-stored configuration parameter; and the transmitter 42 is configured to send data to a changed-to base station by using the reconfigured bearer.

In FIG. 4, in a bus architecture (represented by a bus 400), the bus 400 may include any quantity of interconnected buses and bridges, and the bus 400 connects various circuits including one or more processors represented by the processor 41 and memories represented by a memory 44. The bus 400 may further connect various other circuits, such as a peripheral device, a voltage stabilizer, and a power management circuit. These are known in the art, and therefore are not further described in this specification. A bus interface 45 provides an interface between the bus 400 and the transmitter 42. The transmitter 42 may be a transceiver, and provides a unit configured to communicate with various other apparatuses on a transmission medium.

The processor 41 is responsible for managing the bus 400 and general processing, and the memory 44 may be configured to store data that is used when the processor 41 performs an operation.

Various variation manners and specific examples in the bearer establishment method in the embodiments of FIG. 1 and FIG. 2 are also applicable to the user equipment in this embodiment. According to the detailed description of the foregoing bearer establishment method, a person skilled in the art may clearly know an implementation method of the user equipment in this embodiment. Therefore, for brevity of the specification, details are not described herein.

Figure 5:
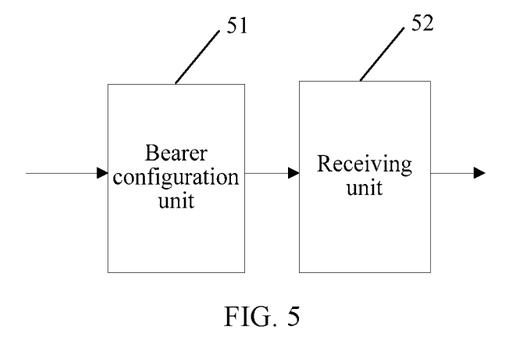
FIG. 5 is a schematic diagram of functional modules of user equipment according to an embodiment of the present invention.

Based on the same invention concept, an embodiment of the present invention further provides a base station. Referring to FIG. 5, FIG. 5 is a schematic diagram of functional modules of a base station according to an embodiment of the present invention. For meanings and specific implementation of terms used in the base station shown in FIG. 5, refer to related descriptions in FIG. 1, FIG. 2, and the embodiments.

As shown in FIG. 5, the base station includes: a bearer configuration unit 51, configured to pre-configure a bearer for the base station, where a configuration parameter used by the base station to configure the bearer includes: an access stratum (AS) configuration parameter, or a configuration parameter used by the base station to configure the bearer includes: an AS configuration parameter and a non-access stratum (NAS) configuration parameter; and a receiving unit 52, configured to receive service data of UE by using the bearer pre-configured by the base station.

Optionally, the bearer pre-configured by the base station includes N bearers, where N is an integer greater than or equal to 1; and the receiving unit 52 is configured to: receive an RRC message, a data packet, or an access sequence that is sent by the UE and that includes an identifier of a bearer configured by the UE; the base station further includes a processing unit 53, configured to select, from the N bearers, a bearer matching the identifier of the bearer configured by the UE, to serve as an access network bearer of the UE; and the receiving unit 52 is configured to receive the service data of the UE by using the selected bearer.

Optionally, the receiving unit 52 is configured to: receive some parameters of configuration parameters of the bearer configured by the UE, where the some parameters include at least one of the following parameters: APN information, a destination gateway address, an uplink TEID, an identifier of a core network bearer, a type of the service data, or a QoS parameter of the service data; and the processing unit 53 is configured to determine the core network bearer of the UE according to the some parameters.

Optionally, the processing unit 53 is configured to: select, according to at least one of the following parameters, a public bearer from public bearers existing between the base station and a core network, to serve as the core network bearer of the UE, where the parameters include: the type of the service data, the QoS parameter of the service data, and a mapping relationship between the public bearer and the bearer that is pre-configured by the base station.

Various variation manners and specific examples in the bearer establishment method in the embodiments of FIG. 1 and FIG. 2 are also applicable to the base station in this embodiment. According to the detailed description of the foregoing bearer establishment method, a person skilled in the art may clearly know an implementation method of the base station in this embodiment. Therefore, for brevity of the specification, details are not described herein.

Figure 6:
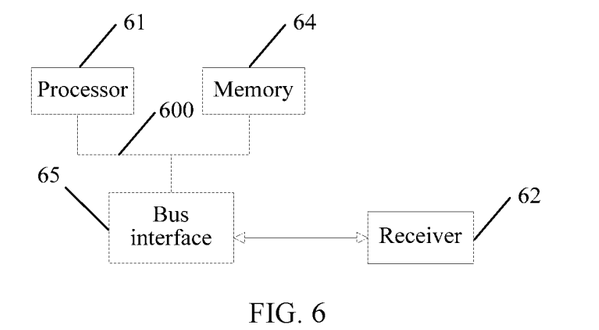
FIG. 6 is a schematic structural diagram of hardware of a base station according to an embodiment of the present invention.

Based on the same invention concept, an embodiment further provides a base station. Referring to FIG. 6, FIG. 6 is a schematic structural diagram of hardware of a base station according to an embodiment of the present invention. For meanings and specific implementation of terms used in the base station shown in FIG. 6, refer to related descriptions in FIG. 1, FIG. 2, and the embodiments.

As shown in FIG. 6, the base station includes: a processor 61, configured to pre-configure a bearer for the base station, where a configuration parameter used by the base station to configure the bearer includes: an access stratum (AS) configuration parameter, or a configuration parameter used by the base station to configure the bearer includes: an AS configuration parameter and a non-access stratum (NAS) configuration parameter; and a receiver 62, configured to receive service data of UE by using the bearer pre-configured by the base station.

Optionally, the bearer pre-configured by the base station includes N bearers, where N is an integer greater than or equal to 1; and the receiver 62 is configured to: receive, an RRC message, a data packet, or an access sequence that is sent by the UE and that includes an identifier of a bearer configured by the UE; and the processor 61 is configured to select, from the N bearers, a bearer matching the identifier of the bearer configured by the UE, to serve as an access network bearer of the UE; and the receiver is configured to receive the service data of the UE by using the selected bearer.

Optionally, after the base station receives the service data of the UE by using the bearer pre-configured by the base station, the receiver 62 is configured to: receive some parameters of configuration parameters of the bearer configured by the UE, where the some parameters include at least one of the following parameters: APN information, a destination gateway address, an uplink TEID, an identifier of a core network bearer, a type of the service data, or a QoS parameter of the service data; and the processor 61 is configured to determine the core network bearer of the UE according to the some parameters.

Optionally, after the base station receives the service data of the UE by using the locally pre-configured bearer, the processor 61 is configured to: select, according to at least one of the following parameters, a public bearer from public bearers existing between the base station and a core network, to serve as the core network bearer of the UE, where the parameters include: the type of the service data, the QoS parameter of the service data, and a mapping relationship between the public bearer and the bearer that is pre-configured by the base station.

In FIG. 6, in a bus architecture (represented by a bus 600), the bus 600 may include any quantity of interconnected buses and bridges, and the bus 600 connects various circuits including one or more processors represented by the processor 61 and memories represented by a memory 64. The bus 600 may further connect various other circuits, such as a peripheral device, a voltage stabilizer, and a power management circuit. These are known in the art, and therefore are not further described in this specification. A bus interface 65 provides an interface between the bus 600 and the receiver 62. The receiver 62 may be a transceiver, and provides a unit configured to communicate with various other apparatuses on a transmission medium.

The processor 61 is responsible for managing the bus 600 and general processing, and the memory 64 may be configured to store data that is used when the processor 61 performs an operation.

Various variation manners and specific examples in the bearer establishment method in the embodiments of FIG. 1 and FIG. 2 are also applicable to the base station in this embodiment. According to the detailed description of the foregoing bearer establishment method, a person skilled in the art may clearly know an implementation method of the base station in this embodiment. Therefore, for brevity of the specification, details are not described herein.

The one or more technical solutions provided in the embodiments of the present invention have at least the following technical effects or advantages.

The embodiments of the present invention provide a bearer establishment method, including: locally configuring, by user equipment, a bearer by using a pre-stored configuration parameter, and sending, by the user equipment, service data to a base station by using the configured bearer.

The user equipment locally configures the bearer by using the pre-stored configuration parameter, and does not need to establish the bearer by exchanging signaling messages multiple times with at least one network device. Therefore, delays and overheads caused when the bearer is established are reduced.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present application without departing from a scope of the present application. The present application is intended to cover these modifications and variations of the present application provided that they fall within the scope of protection defined by the following claims and their equivalent technologies.

What is claimed is:

1. A bearer establishment method, comprising:
   retrieving, by user equipment (UE), a first identifier of a pre-stored physical layer configuration parameter, and a second identifier of a pre-stored media access layer configuration parameter, wherein the pre-stored physical layer configuration parameter and the pre-stored media access layer configuration parameter are pre-stored according to a protocol rule;
   receiving, by the UE, broadcast information, wherein the broadcast information includes a third identifier, another physical layer configuration parameter, a fourth identifier, and another media access layer configuration parameter, and wherein the third identifier is associated with the another physical layer configuration parameter, and the fourth identifier is associated with the another media access layer configuration parameter;
   comparing, by the UE, the first identifier with the third identifier;
   comparing, by the UE, the second identifier with the fourth identifier;
   merging, by the UE, the pre-stored physical layer configuration parameter with the another physical layer configuration parameter and the pre-stored media access layer configuration parameter with the another media access layer configuration parameter based on the first identifier matching the third identifier and the second identifier matching the fourth identifier;
   selecting, by the UE, one set of configuration parameters from the merged configuration parameters;
   configuring, by the UE, a bearer for the UE by using the selected set of configuration parameters; and
   sending, by the UE, service data to a base station by using the bearer.

2. The method according to claim 1, wherein after the configuring, by the UE, the bearer for the UE by using the selected set of configuration parameters, the method further comprises:
   sending, by the UE, an identifier of the bearer to the base station, wherein the identifier of the bearer is sent in a radio resource control (RRC) message, a data packet, or an access sequence, and the identifier of the bearer is used by the base station to determine an access network bearer of the UE.

3. The method according to claim 1, wherein after the sending, by the UE, the service data to the base station by using the bearer, the method further comprises:
   sending, by the UE, one or more configuration parameters of the bearer to the base station, wherein the one or more configuration parameters of the bearer are used by the base station to determine a core network bearer of the UE, and the one or more configuration parameters of the bearer comprise at least one of the following parameters: APN information, a destination gateway address, an uplink tunnel endpoint identifier (TED), an identifier of the core network bearer, or a type of the service data.

4. The method according to claim 1, wherein after the sending, by the UE, the service data to the base station by using the bearer, the method further comprises:
in response to a change of a serving cell in which the UE is located or a change of the base station serving the UE, locally reconfiguring, by the UE, a bearer by using pre-stored configuration parameters; and
sending, by the UE, data to a changed-to base station by using the reconfigured bearer.

5. An apparatus, comprising:
a processor configured to:
retrieve a first identifier of a pre-stored physical layer configuration parameter, and a second identifier of a pre-stored media access layer configuration parameter, wherein the pre-stored physical layer configuration parameter and the pre-stored media access layer configuration parameter are pre-stored according to a protocol rule;
receive broadcast information, wherein the broadcast information includes a third identifier, another physical layer configuration parameter, a fourth identifier, and another media access layer configuration parameter, and wherein the third identifier is associated with the another physical layer configuration parameter, and the fourth identifier is associated with the another media access layer configuration parameter;
compare the first identifier with the third identifier;
compare the second identifier with the fourth identifier;
merge the pre-stored physical layer configuration parameter with the another physical layer configuration parameter and the pre-stored media access layer configuration parameter with the another media access layer configuration parameter based on the first identifier matching the third identifier and the second identifier matching the fourth identifier;
select one set of configuration parameters from the merged configuration parameters; and
configure a bearer for UE by using the selected set of configuration parameters; and
a transmitter, configured to send service data to a base station by using the bearer.

6. The apparatus according to claim 5, wherein the transmitter is further configured to send an identifier of the bearer to the base station, wherein the identifier of the bearer is sent in a radio resource control (RRC) message, a data packet, or an access sequence, and the identifier of the bearer is used by the base station to determine an access network bearer of the UE.

7. The apparatus according to claim 5, wherein the transmitter is further configured to send one or more configuration parameters of the bearer to the base station, wherein the one or more configuration parameters of the bearer are used by the base station to determine a core network bearer of the UE, and the one or more configuration parameters of the bearer comprise at least one of the following parameters: APN information, a destination gateway address, an uplink TEID, an identifier of the core network bearer, or a type of the service data.

8. The apparatus according to claim 5, wherein the processor is further configured to: in response to a change of a serving cell in which the UE is located or a change of the base station serving the UE, locally reconfigure a bearer by using pre-stored configuration parameters; and the transmitter is further configured to send data to a changed-to base station by using the reconfigured bearer.

9. An apparatus, comprising:
a processor, configured to pre-configure N bearers for a base station using N sets of pre-stored configuration parameters a configuration parameter, wherein N is an integer greater than or equal to 1, and each of the N sets of pre-stored configuration parameters comprises an access stratum (AS) configuration parameter;
a transmitter, configured to transmit broadcast information, wherein the broadcast information includes a third identifier, another physical layer configuration parameter, a fourth identifier, and another media access layer configuration parameter, and wherein the third identifier is associated with the another physical layer configuration parameter, and the fourth identifier is associated with the another media access layer configuration parameter; and
a receiver, configured to receive service data of user equipment (UE) by using a bearer configured by the UE based on merged configuration parameters, wherein the merged configuration parameters comprises a first merged configuration parameter and a second merged configuration parameter, the first merged configuration parameter is merged from the another physical layer configuration parameter and a pre-stored physical layer configuration parameter that is pre-stored at the UE according to a protocol rule, a first identifier of the pre-stored physical layer configuration parameter matches the third identifier in the broadcast information, the second merged configuration parameter is merged from the another media access layer configuration parameter and a pre-stored media access layer configuration parameter that is pre-stored at the UE according to the protocol rule, a second identifier of the pre-stored media access layer configuration parameter matches the fourth identifier in the broadcast information, and wherein the bearer configured by the UE is one of the N bearers pre-configured by the base station.

10. The apparatus according to claim 9, wherein the receiver is further configured to receive an identifier of the bearer configured by the UE, wherein the identifier of the bearer is received in a radio resource control (RRC) message, a data packet, or an access sequence that is sent by the UE;
the processor is further configured to select, from the N bearers, a bearer matching the identifier of the bearer configured by the UE, to serve as an access network bearer of the UE; and
the receiver is further configured to receive the service data of the UE by using the selected bearer.

11. The apparatus according to claim 9, wherein the receiver is further configured to receive one or more configuration parameters of the bearer configured by the UE, wherein the one or more configuration parameters of the bearer comprise at least one of access point name (APN) information, a destination gateway address, an uplink tunnel endpoint identifier (TED), an identifier of a core network bearer, a type of the service data, or a type of the service data; and
the processor is further configured to determine a core network bearer of the UE according to the one or more configuration parameters of the bearer.

12. The apparatus according to claim 9, wherein the processor is further configured to select, a public bearer from public bearers existing between the base station and a core network to serve as a core network bearer of the UE according to at least one of a type of the service data, a quality of service (QoS) parameter of the service data, or a mapping relationship between the public bearer and the N bearers that are pre-configured by the base station.

* * * * *